No. 895,792. PATENTED AUG. 11, 1908.
J. ROTH.
INK WELL.
APPLICATION FILED APR. 12, 1907.
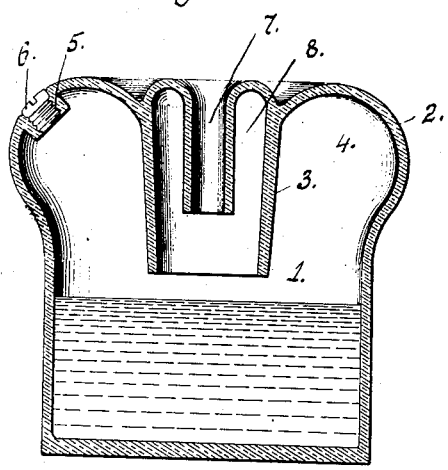
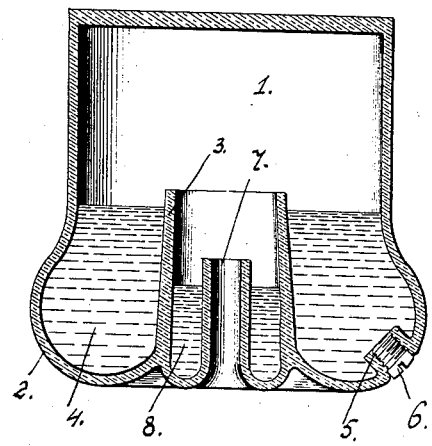
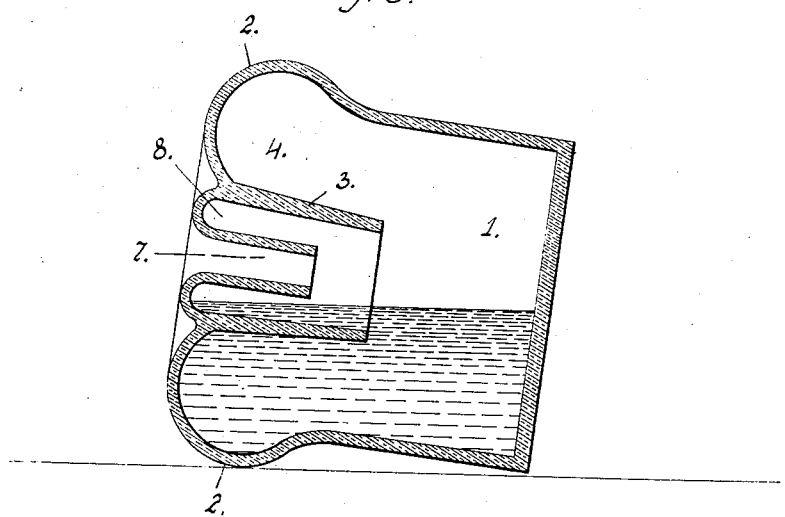
WITNESSES:
A. H. Rabság,
X. H. Butler
INVENTOR
John Roth
BY H. C. Everitt Co.,
Attorneys

UNITED STATES PATENT OFFICE.

JOHN ROTH, OF WEST HOMESTEAD, PENNSYLVANIA.

INK-WELL.

No. 895,792.  Specification of Letters Patent.  Patented Aug. 11, 1908.

Application filed April 12, 1907. Serial No. 367,878.

*To all whom it may concern:*

Be it known that I, JOHN ROTH, a subject of the Emperor of Austria-Hungary, residing at West Homestead, in the county of Allegheny and State of Pennsylvania, have invented certain new and useful Improvements in Ink-Wells, of which the following is a specification, reference being had therein to the accompanying drawing.

This invention relates to ink wells, and the invention has for its object to provide a novel ink well which when accidentally upset or tilted will not spill or precipitate its contents.

Another object of this invention is to provide a simple and inexpensive ink well that can be constructed from a single piece of material, the well being preferably made of vitreous material and shaped to provide a neat and attractive appearance.

With these and other objects in view, the invention consists in the novel construction of parts to be hereinafter more fully described and then specifically pointed out in the appended claims.

Referring to the drawing forming part of this specification, like numerals of reference designate corresponding parts throughout the several views, in which:—

Figure 1 is a vertical sectional view of my improved ink well, Fig. 2 is a similar view of the ink well in an inverted position, Fig. 3 is a similar view in a tilted position.

My improved ink well is constructed of a piece of vitreous material molded or blown to form an ink or fluid receptacle 1 terminating in a bowl-shaped top 2 having a depending central, cylindrical flange 3, which extends approximately half way into the receptacle 1 and which is of the same diameter throughout its length. The bowl-shaped top 2 of the receptacle 1 provides an annular compartment 4 surrounding the flange 3, and in order that ink or fluid can be placed in the receptacle 1 or withdrawn therefrom, I provide the bowl-shaped top 2 with an interiorly threaded nipple 5 having a detachable plug 6.

The top of the flange 3 carries a central depending flange 7 of approximately the same diameter throughout its length, said flanges forming a small, annular compartment 8 within the flange 3, whereby when the ink well is inverted or tilted the fluid or contents of the receptacle will flow partly into the compartment 8, but mostly into the annular compartment 4 surrounding the flange 3.

It will be apparent from the illustration of my invention that it is impossible for the ink or fluid within the receptacle 1 to be ejected therefrom by the accidental displacement of the ink well.

The construction of the compartment 4 enables the major part of the ink to gather therein while the well is in an inverted position thereby preventing top-heaviness.

It is obvious that such changes in the size, shape and minor details of construction of my improved ink well as are permissible by the appended claims, may be resorted to without departing from the spirit and scope of the invention.

What I claim and desire to secure by Letters Patent, is:—

An ink well formed in one piece and comprising an ink receptacle having a top, said top formed with two concentrically arranged depending flanges spaced one from the other and arranged centrally of the top of the receptacle, and having a pen opening formed within the inner flange, said flanges being of substantially unvarying diameter throughout and at their top being on the same plane and located on the same plane with the top, the said top being of greater diameter than the body of the receptacle forming thereby an annular chamber surrounding the said flanges, the said annular chamber and the space between the two concentric flanges constituting a receiving space for the ink when the well is inverted.

In testimony whereof I affix my signature in the presence of two witnesses.

JOHN ROTH.

Witnesses:
MAX II. SROLOVITZ,
A. H. RABSAIG.